R. N. OAKMAN, Jr.
TABLE-CUTLERY.

No. 184,215. Patented Nov. 7, 1876.

WITNESSES:
Gustavoh Dietrich
Alex F. Roberts

INVENTOR:
R. N. Oakman Jr.
BY
ATTORNEYS.

UNITED STATES PATENT OFFICE.

RICHARD N. OAKMAN, JR., OF NEW YORK, N. Y., ASSIGNOR TO JOHN RUSSELL CUTLERY COMPANY, OF TURNER'S FALLS, MASS.

IMPROVEMENT IN TABLE-CUTLERY.

Specification forming part of Letters Patent No. 184,215, dated November 7, 1876; application filed November 6, 1875.

*To all whom it may concern:*

Figure 1:
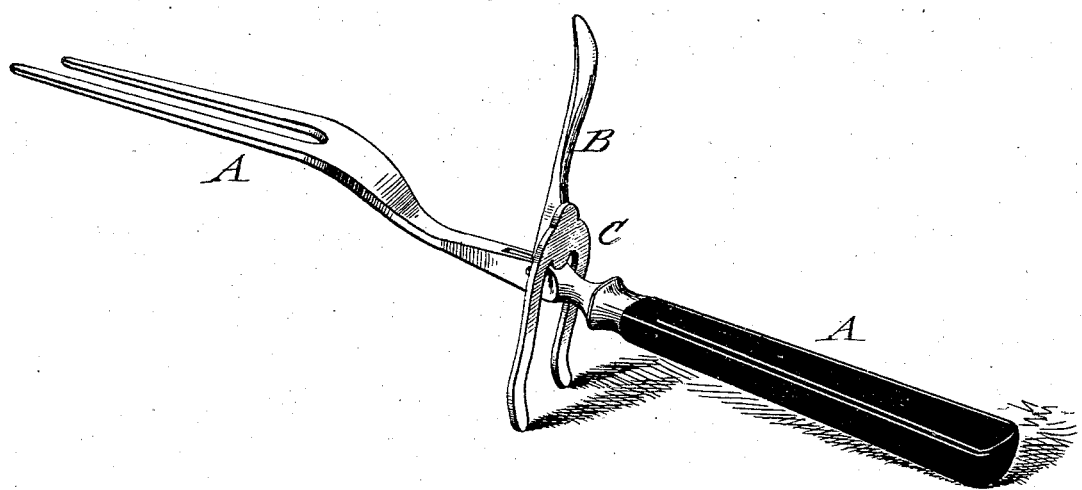
Figure 2:
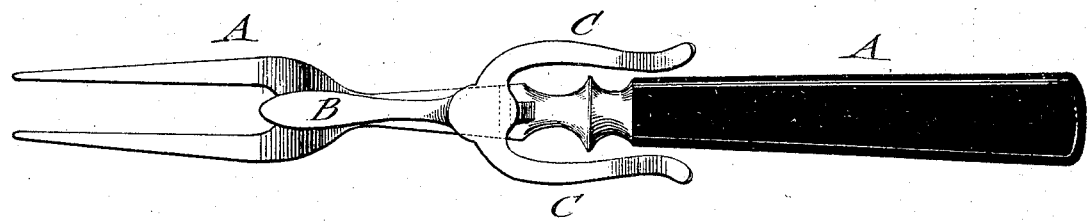

Be it known that I, RICHARD N. OAKMAN, Jr., of the city, county, and State of New York, have invented a new and useful Improvement in Table-Cutlery, of which the following is a specification:

Figure 1 represents a perspective view of my improved carving-fork, shown with guard up and supported on the rest, and Fig. 2 is a top view of the fork with the guard folded down.

Similar letters of reference indicate corresponding parts.

My invention relates to an improved carving-fork, by which an extension of the common pivotal spring-guard serves in a very simple and neat manner as a support or rest for the fork when the same is placed on the table; and the invention consists of a fork with a pivoted spring-guard, having a pronged extension that extends over the shank of the fork to form a rest when thrown up.

In the drawing, A represents a carving-fork of the customary size and shape, which is provided with a pivoted spring-guard, B, as commonly used, for being thrown up at suitable angle to its shank to protect the hand against injury by the carving-knife. The guard B may be folded down on the shank until it rests on the broadening part or bosom of the fork. The spring-guard B is provided with a pronged extension, C, that is either made separate or in one piece with the guard, and attached to the same at a short distance from the shank of the fork, to allow the unobstructed swinging of the guard and extension on its pivot. The pronged extension C passes, when the guard is thrown up, sidewise of the shank, so as to form a convenient support or rest for the fork, as shown in Fig. 1, or it passes parallel to and at both sides of the shank toward the handle, when the guard is folded down after use, as seen in Fig. 2, forming thus a neat and ornamental attachment to the fork.

I am aware that carving-forks with swinging guards and rest-pieces have been in use; but I claim that the attachment of the rest to the common spring-guard in the simple and durable manner shown has not heretofore been employed.

Having thus described my invention, I claim as new and desire to secure by Letters Patent—

The combination of the recess and spring in back of shank, and the guard hinged in said recess, with the two legs attached to said guard above the recess and folding with one prong at each side of shank, as and for the purpose specified.

RICHARD N. OAKMAN, JR.

Witnesses:
PAUL GOEPEL,
T. B. MOSHER.